March 14, 1933. E. J. N. MILLET 1,901,523
AUTOMATICALLY LOADING MACHINE FOR DISTRIBUTING SAND, GRAVEL, AND THE LIKE
Filed June 6, 1930 10 Sheets-Sheet 2
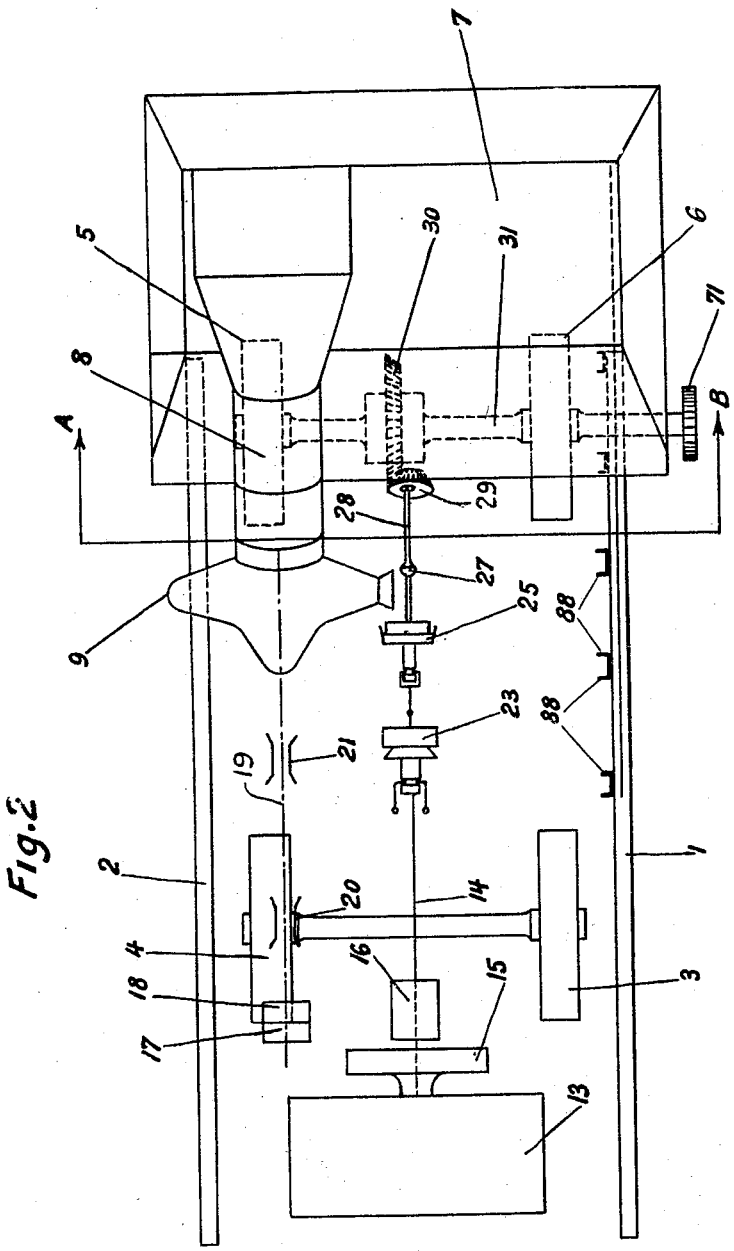

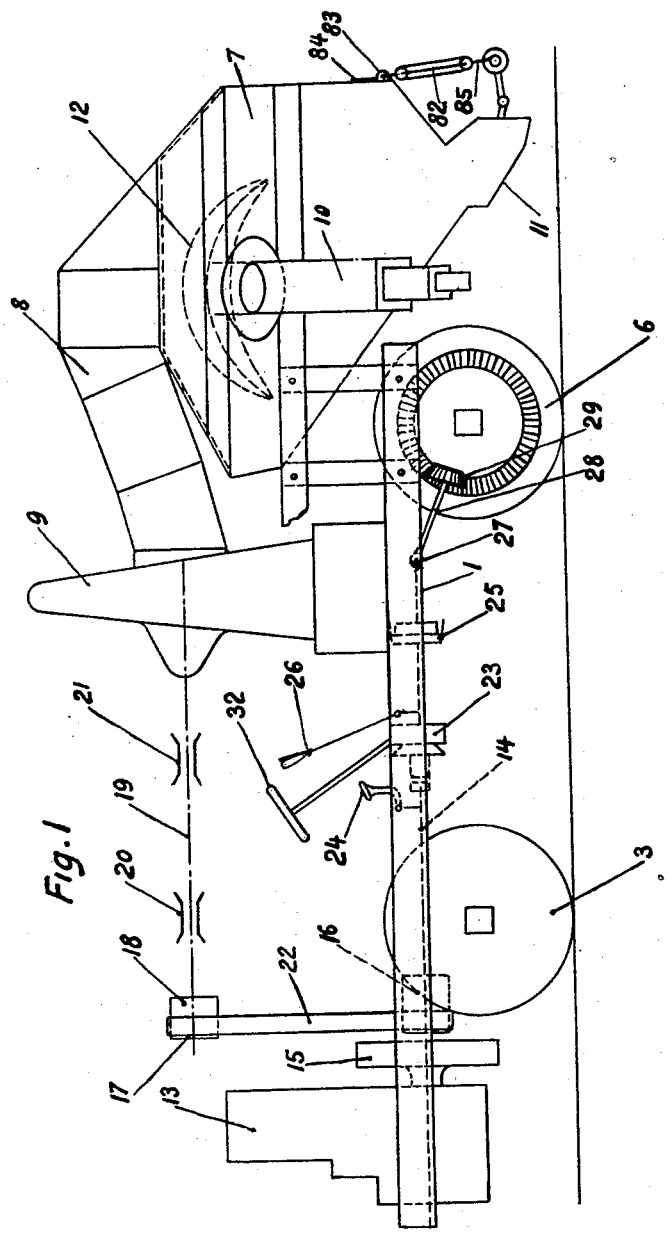

March 14, 1933.  E. J. N. MILLET  1,901,523
AUTOMATICALLY LOADING MACHINE FOR DISTRIBUTING SAND, GRAVEL, AND THE LIKE
Filed June 6, 1930   10 Sheets-Sheet 3
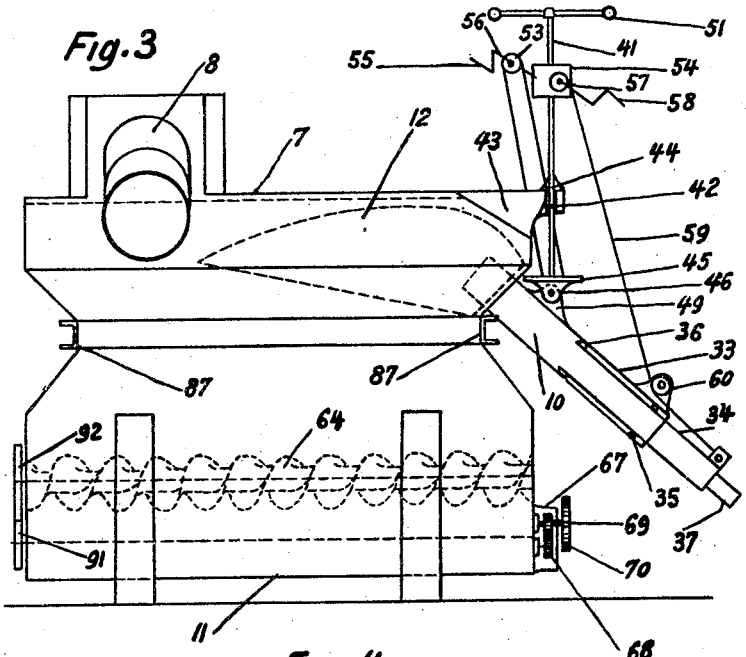
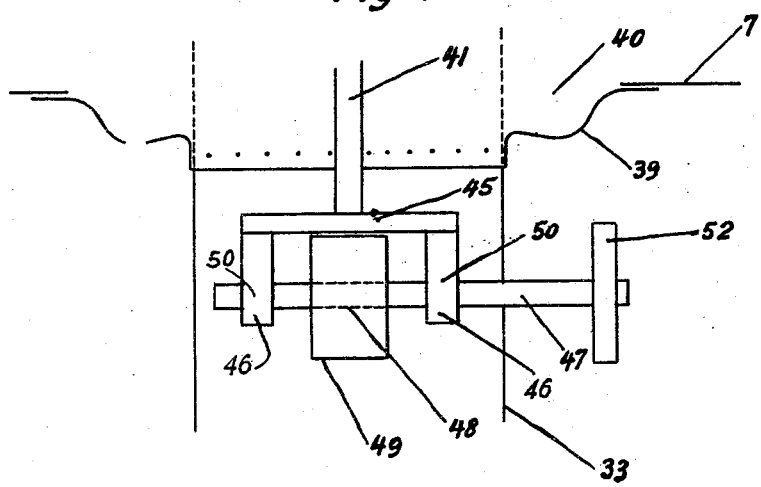
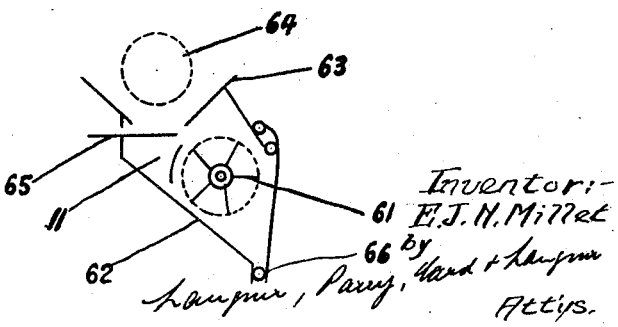
Inventor:-
E. J. N. Millet March 14, 1933.  E. J. N. MILLET  1,901,523
AUTOMATICALLY LOADING MACHINE FOR DISTRIBUTING SAND, GRAVEL, AND THE LIKE
Filed June 6, 1930    10 Sheets-Sheet 4
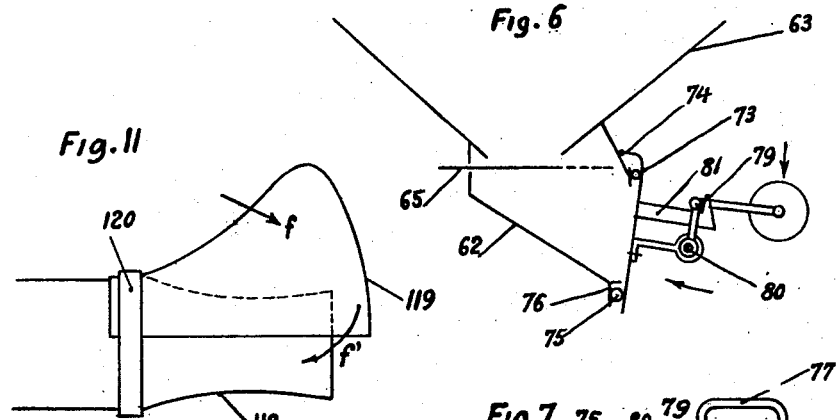
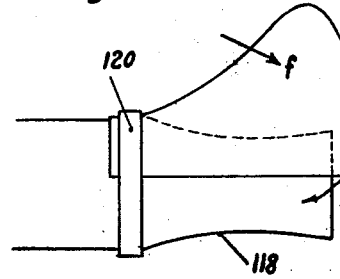
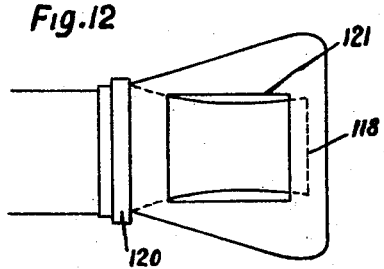
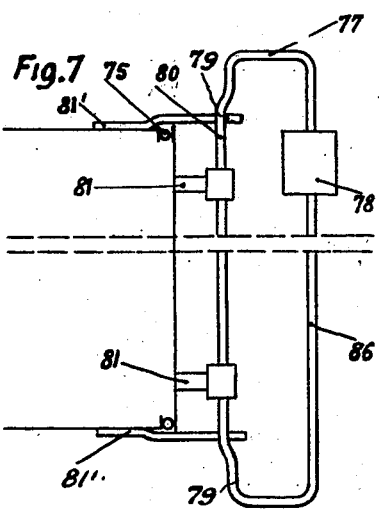
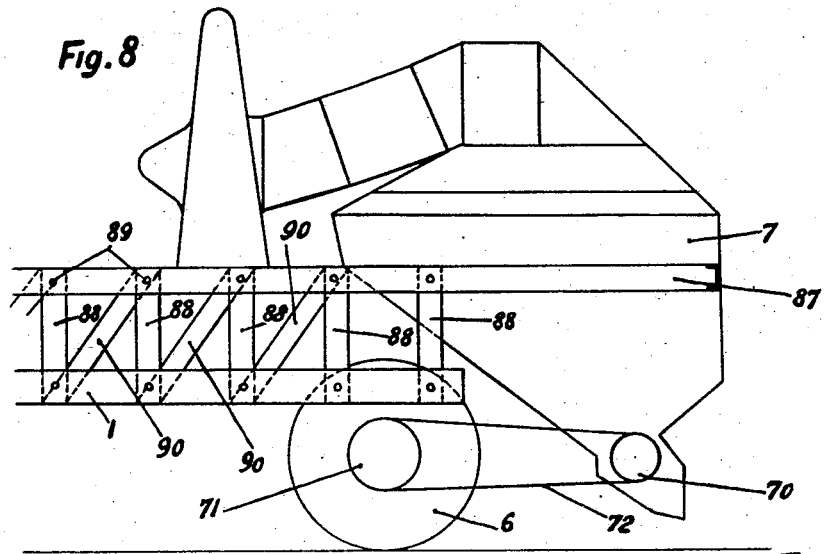

March 14, 1933.  E. J. N. MILLET  1,901,523
AUTOMATICALLY LOADING MACHINE FOR DISTRIBUTING SAND, GRAVEL, AND THE LIKE
Filed June 6, 1930  10 Sheets-Sheet 5

Inventor:-
E. J. N. Millet

March 14, 1933.  E. J. N. MILLET  1,901,523
AUTOMATICALLY LOADING MACHINE FOR DISTRIBUTING SAND, GRAVEL, AND THE LIKE
Filed June 6, 1930  10 Sheets-Sheet 6

March 14, 1933.　　　E. J. N. MILLET　　　1,901,523
AUTOMATICALLY LOADING MACHINE FOR DISTRIBUTING SAND, GRAVEL, AND THE LIKE
Filed June 6, 1930　　　10 Sheets-Sheet 7

Inventor:-
E. J. N. Millet

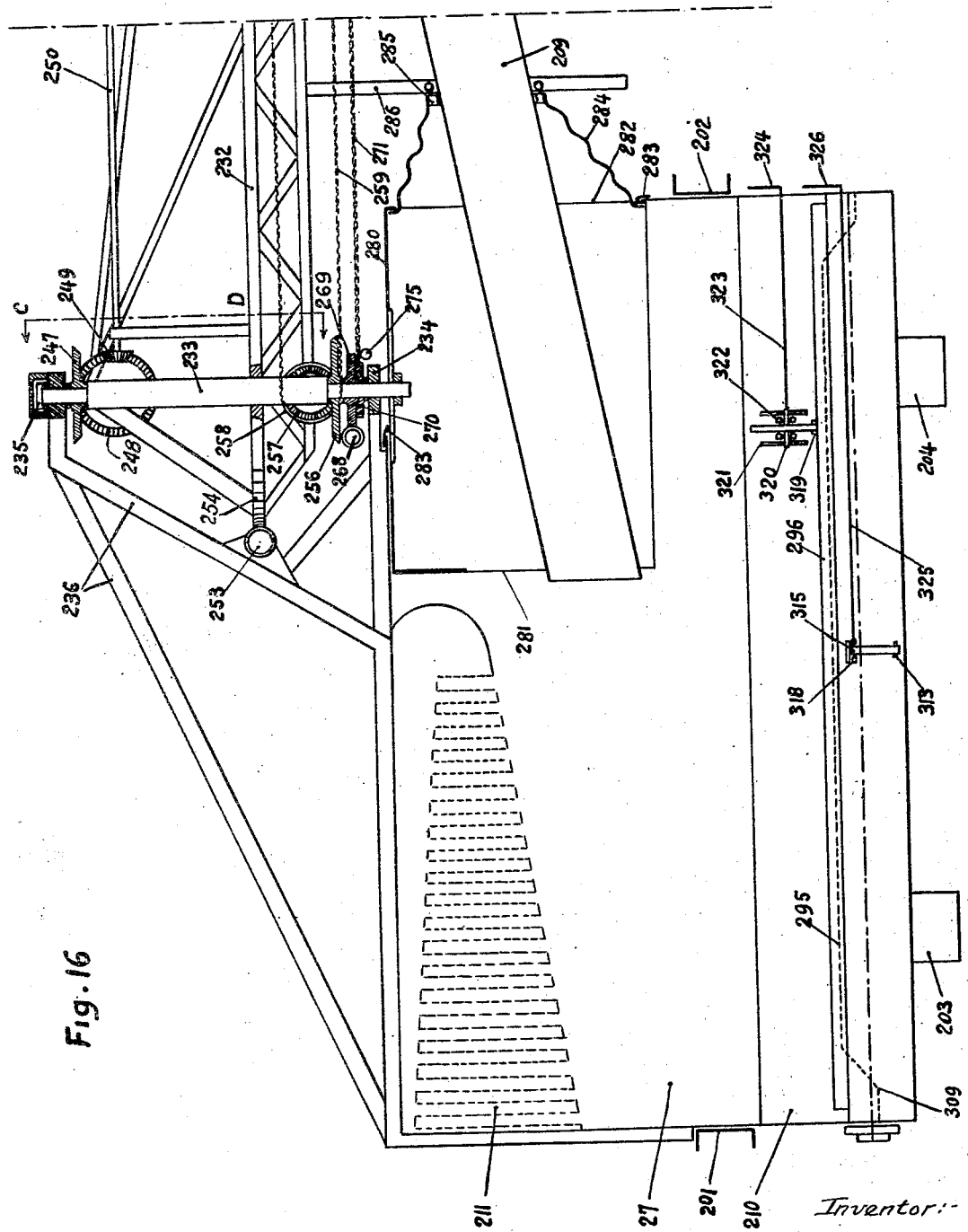

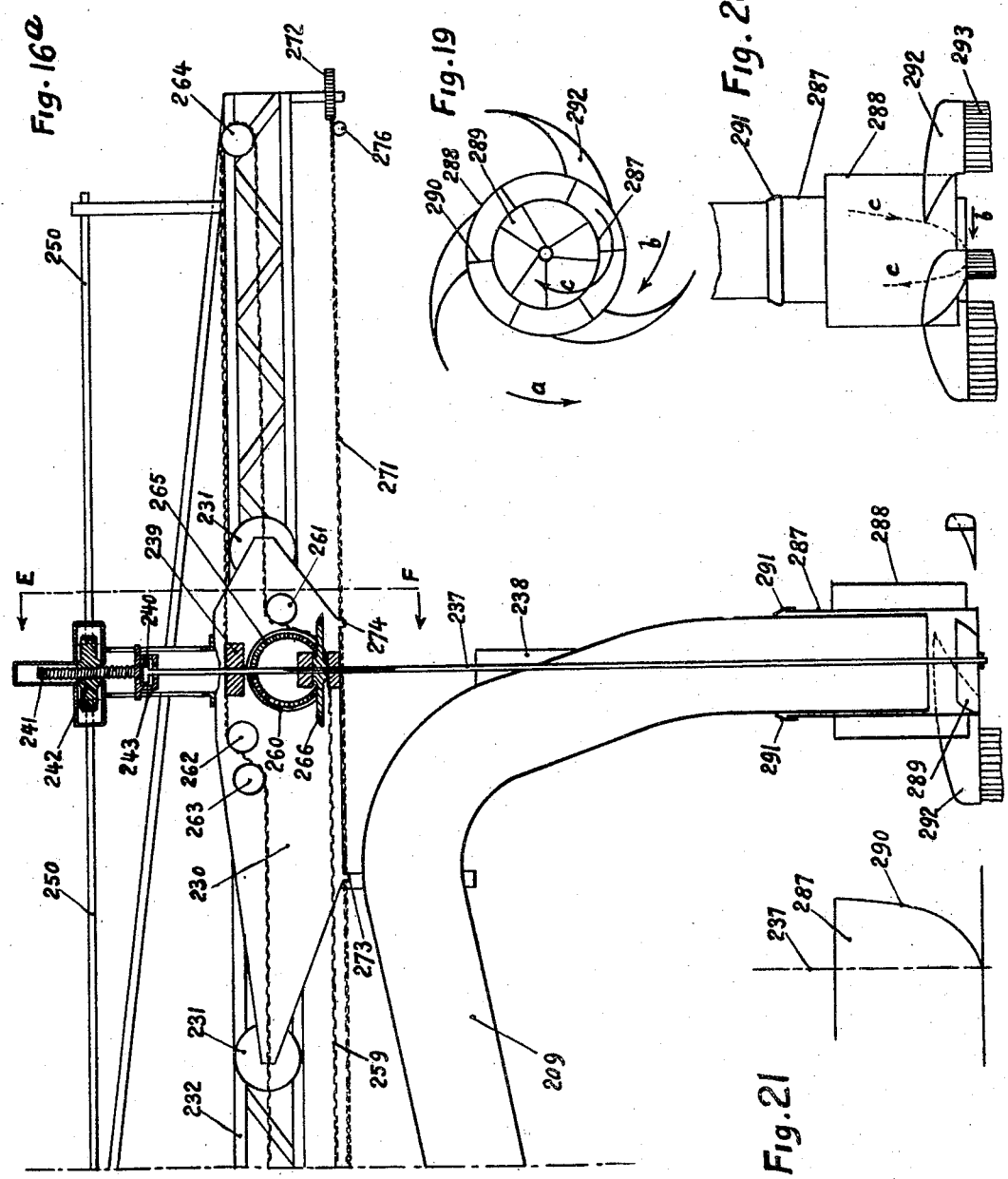

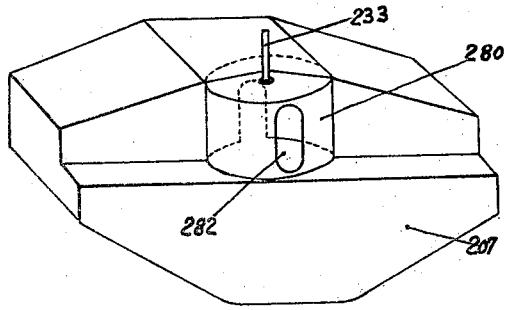
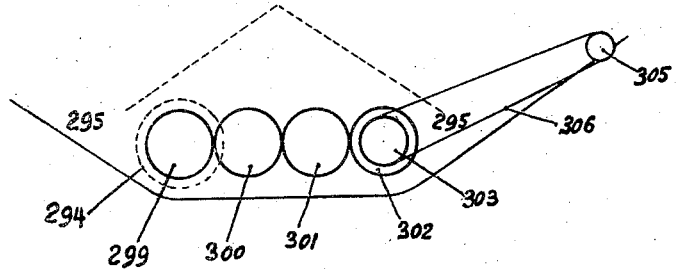
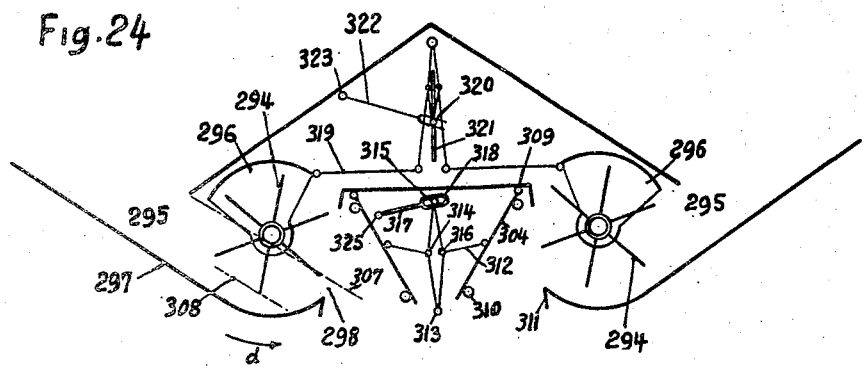
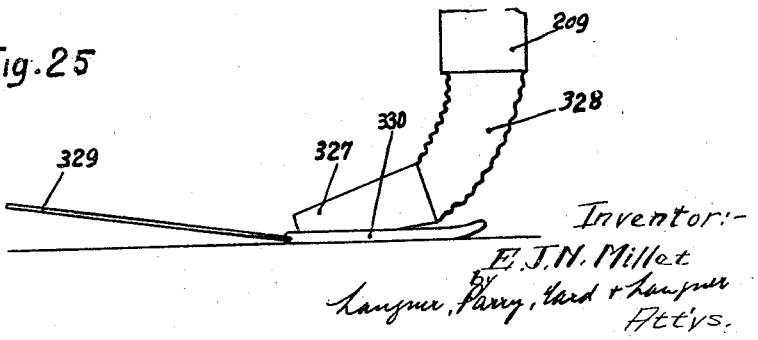

Patented Mar. 14, 1933

1,901,523

UNITED STATES PATENT OFFICE

EUGÈNE JUSTIN NESTOR MILLET, OF PARIS, FRANCE

AUTOMATICALLY LOADING MACHINE FOR DISTRIBUTING SAND, GRAVEL, AND THE LIKE

Application filed June 6, 1930, Serial No. 459,490, and in France June 18, 1929.

The surface coating of roads by means of tar or bitumen spreading apparatuses having a large output requires the rapid distribution of an important volume of sand or gravel.

The apparatuses used heretofore for this distribution of sand or gravel had to be loaded by hand, which was long and costly or else through mechanical means requiring the constitution of large provisions of material and the inconvenient transportation thereof at the moment of use.

My invention has for its object a machine affording means for the pneumatic loading of sand or gravel heaps previously provided at suitable places along the side-way and for the immediate distribution of the material during progress from one heap to the next. This allows surface coating to be effected in a single operation consisting in sweeping the road, pouring the binding medium out and distributing the sand or like material. My improved machine allows also auxiliary work to be effected such as the recovery of the surplus material left over after the coating is dry or provided by the wear of ordinary macadamized roads.

My improved machine is constituted by an automobile frame carrying a reservoir for the material to be distributed, a device for pneumatically loading said reservoir including a special rotary suction nozzle and means for uniformly distributing the material on the road.

I have described several forms of execution of my invention on accompanying drawings.

Fig. 1 is a side view of the whole device.

Fig. 2 is a plan view of same with the platform removed so as to show the controlling parts.

Fig. 3 is a cross-section along the line A—B of Fig. 2, the view being taken in the direction of the arrows.

Fig. 4 shows in detail the supporting means for the suction pipe.

Fig. 5 is a cross-section of the distributor.

Figs. 6 and 7 are plan and side views of the fluidtight closing means of the distributor.

Fig. 8 is a side view of the controlling means for the distributor.

Figs. 11 and 12 are a plan and side view of a form of execution of the suction nozzle.

Fig. 16 and Fig. 16a show respectively the two halves of a cross-section of the machine along line AB of Fig. 14, the view being taken in the direction of the arrow.

Figs. 19 and 20 show the said suction nozzle in plan and side view.

Fig. 21 shows a partition in the nozzle.

Fig. 22 shows in perspective the reservoir and a rotary nozzle carrying part.

Figs. 23 and 24 are side and sectional views of the distributing means.

Fig. 25 is a cross-section of the material recovering means.

Figure 9:
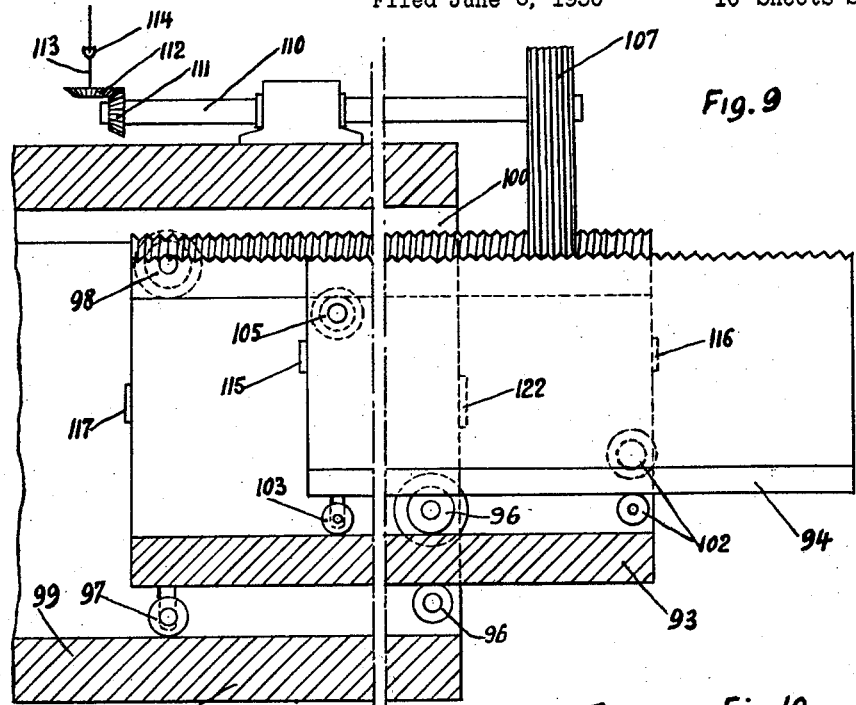
Figs. 9 and 10 show respectively in longitudinal axial cross-section and in transversal cross-section the supporting means for a modification of the suction pipe in three elements.
Figure 10:
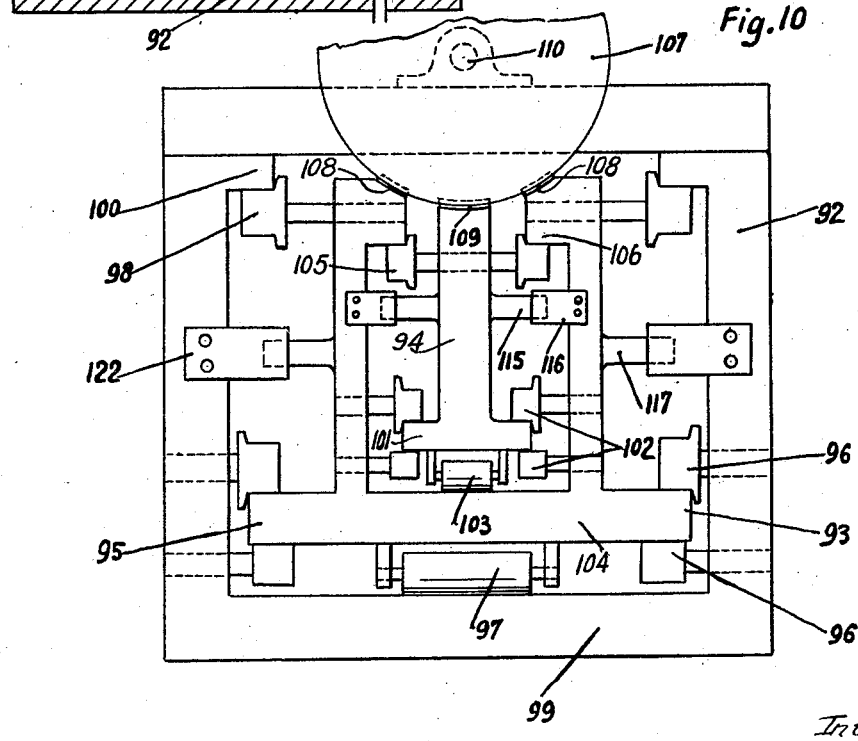
Figure 13:
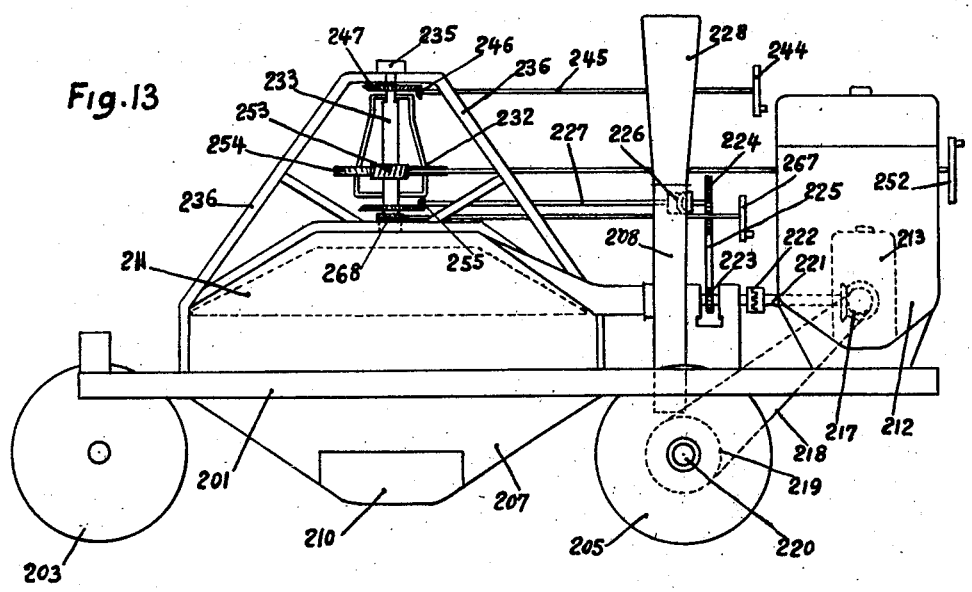
Fig. 13 is a side view of second form of execution of my invention.
Figure 14:
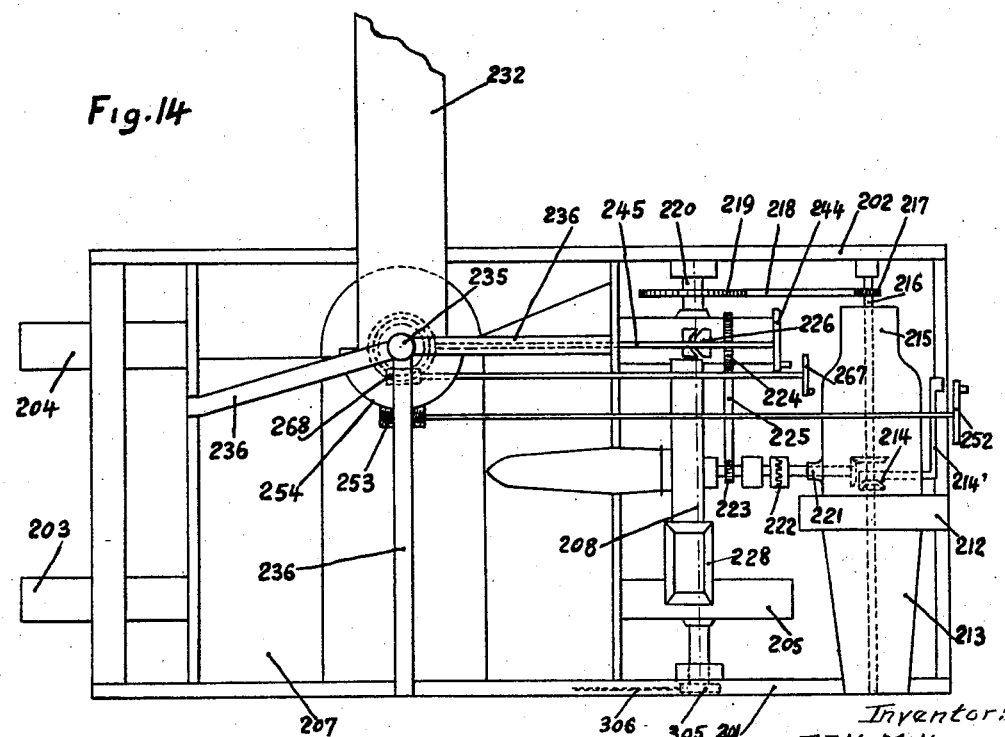
Fig. 14 is a plan view thereof with the platform removed so as to show the control and transmission parts.
Figure 15:
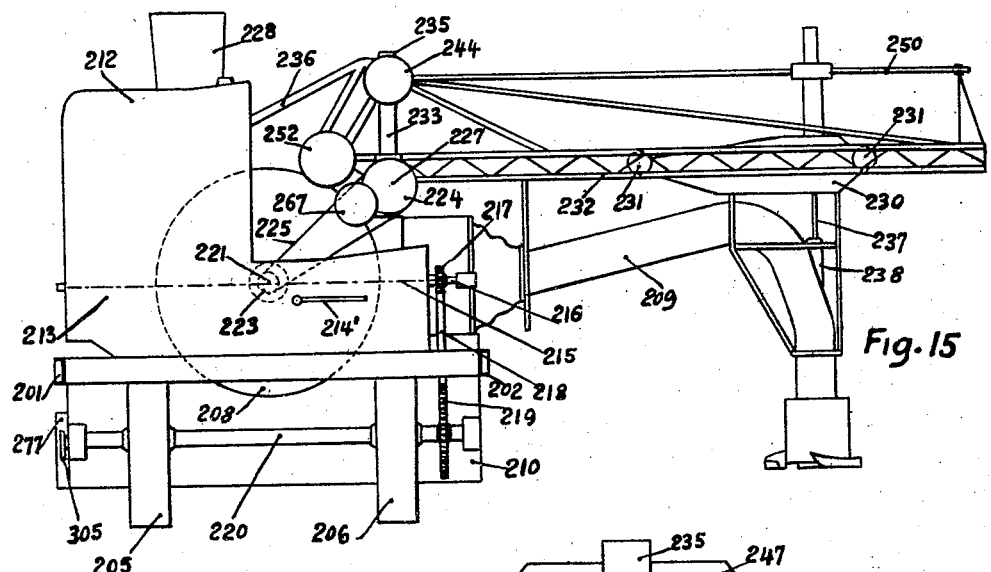
Fig. 15 is a view of the apparatus from the rear.
Figure 17:
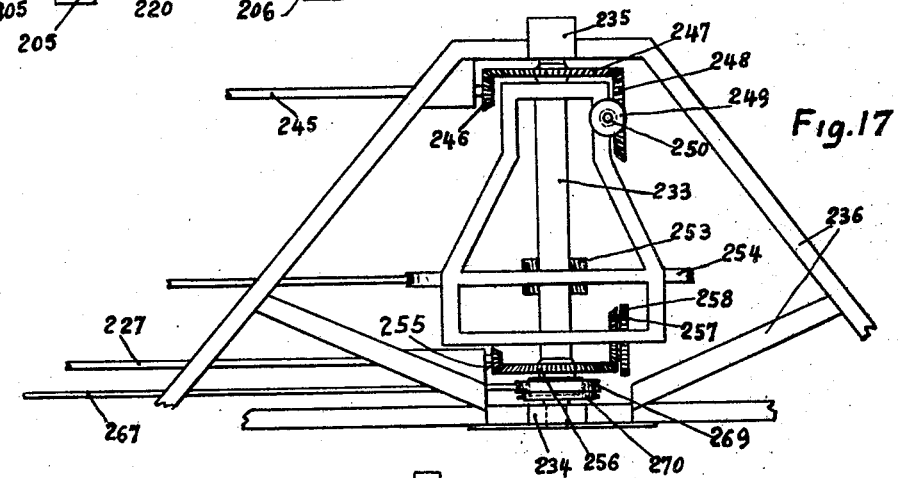
Figs. 17 and 18 show in detail the controlling means for the corresponding suction nozzle.
Figure 18:
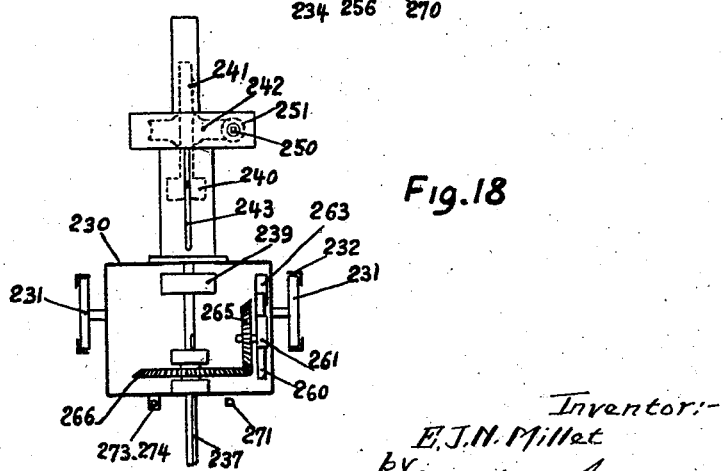

The machine illustrated in Figs. 1, 2 and 8 comprises a frame constituted by two longitudinal beams 1 and 2 suitably interconnected and carried through yielding suspension means not shown by the wheels 3—4—5—6. The frame carries a reservoir 7 the suction pipe 8 of which is connected with the suction outlet of the fan 9. This reservoir comprises a suction pipe 10 and a distributor 11 to be described hereinafter. A deflecting plate 12 is adapted to stop the sand carried along by the air current provided for suction and to cause it to fall to the bottom of the reservoir 7. The machine comprises a motor 13 adapted to control either the fan or the front driving wheels controlling in their turn the distributor as explained hereinafter. The shaft 14 of the motor carries a fly-wheel 15 on which is keyed the pulley 16. Two pulleys 17—18 are carried by the fan-shaft 19; one of these pulleys is fixedly and the other is loosely secured thereto. The fan-shaft is carried in bearings diagrammatically shown at 20—21 and suitably carried by the vehicle frame. The belt 22 may be brought at will through the usual control means not shown over either of pulleys 17–18 whereby the fan 9 may be started or stopped as desired.

The transmission line comprises moreover an inverted cone clutch 23 of the usual type controlled through the pedal 24, a clutch 25 of the corrugated type controlled through the handlever 26 and a cardan joint 27. The last shaft 28 of this transmission line ends with a bevel wheel 29 meshing with a bevel wheel 30 keyed to the driving axle 31 or forming part of a differential gear of the usual type. For sake of clearness I have not shown the bearings for the different shafts of the transmission line. The steering is provided through the rear wheels in the usual manner, the steering wheel 32 being suitably disposed in front of the driver. When the latter wishes to start his vehicle, it is sufficient for him to push the lever 26 so as to connect the clutch 25 and then to release control pedal 24. The suction pipe 10 comprises two tubes 33, 34, the tube 34 being adapted to slide inside the tube 33 having a larger diameter with the interposition of rollers 35. The tube 34 carries moreover sliding means 36 (Fig. 3) which provide a very slight transversal play for the tube 34 inside the tube 33. It carries also a suction pipe 37 of any known type. I will describe hereinafter the device allowing the control of the penetration of the tube 34 into the pipe 10 or its projection beyond it so as to make it reach more or less remote parts of the sand heaps shown at 38. A suitable fluidtight arrangement 39 of leather, fabric or the like is secured on one hand on the reservoir 7 provided with a suitable aperture 40 (Fig. 4) for the passage of the suction pipe and on the other on the suction pipe 33.

The suction pipe is carried by a vertical shaft 41 (Figs. 3 and 4) rotatably borne in a bearing 42 supported by a bracket 43, and resting through an enlargement 44 against a suitably shaped surface formed at the upper end of the bearing. This shaft carries a horizontal plate 45 provided with two projections 46 secured thereto in any suitable manner. A horizontal shaft 47 keyed inside an aperture 48 provided in the projection 49 of the tube 33 is rotatably carried in the apertures 50 provided in the projections 46. A control lever 51 allows the outlet or nozzle of the tube 10 to be directed as desired with reference to a given vertical plane. The nozzle may be controlled as to height by a pinion 52 keyed to the shaft 47 and connected through a sprocket chain with a pinion 53 rotatably carried by a support 54. This pinion is controlled through the crank 55 by the operator. The shaft 56 of the pinion 53 carries a ratchet wheel not shown engaged by a catch not shown adapted to pivot on its support 54. This arrangement holds the pipe in any desired angular position with reference to the vertical. When it is desired to lower the pipe, it is sufficient to raise the catch until the end of the pipe has moved into the desired position. The support 54 carries moreover a drum 57 controlled by a crank 58 round which the cable 59 is wound so as to make the pipe element 34 pass inside the pipe 33. This cable passes round the pulley 60 rotatably secured to the tube 33. The drum carries also a ratchet wheel meshing with a catch pivotally secured to the support 54.

The distributor 11 (Figs. 1, 3 and 5) comprises a paddle wheel 61 rotating inside a prismatic box at the bottom of the reservoir 7. Over this box is disposed a hopper 63 wherein a distributing screw conveyor 64 is adapted to rotate. A gate 65 serves to adjust the amount of sand admitted in the hopper. The sand then slides over the sloping plane 62 and is carried along towards the outlet 66 by the blades of the wheel 61 rotating in the direction of the arrow. For controlling said wheel, I may dispose for instance on the side of the distributor inside a casing 67 (Fig. 3) a pinion 68 keyed to the shaft of the paddle wheel. A pinion 71 having the same pitch is keyed to the driving axle and these two wheels are connected through a sprocket chain 72. The paddle wheel controls through the gear wheels 91 and 92 (Fig. 3) the rotation of the screw conveyor 64.

When the reservoir is being filled, it is necessary to prevent any entrance of air into it otherwise than through the sand sucking pipe. It is therefore necessary to prevent any entrance of air into it otherwise than through the sand sucking pipe. It is therefore necessary to close in an airtight manner the distributor box. Moreover this box must be easy to open for distributing the sand or like material.

To this end I use the arrangement shown in Figs. 6 and 7. The cover 73 having the shape shown is hingedly secured to the distributor box. It carries at its periphery a leather pad which for the closed position of the cover is tightly held between the cover 73 and the flange 76 raised on the box.

The device adapted to exert an energetic pressure on the cover 73 comprises a loop-shaped lever 77 carrying weights 78 and bent so as to make the inner part of the loop comprise eccentric elements 79 and 80. The elements 80 are rotatably carried by supports 81 secured to the cover. When the cover is allowed to fall, the elements 79 engage the hooks 81' secured to the sides of the distributor. It is apparent that when the weights move downwards as illustrated by the vertical arrow while the element 79 is held by the end of the hook the branch 80 will exert an energetic pressure on the cover in the direction of the arrow I have shown in Fig. 1 and arrangement affording means for opening the cover 73. This arrangement comprises a tackle 82 adapted to be hooked on one hand through the hook 83 to the hook 84 secured to the reservoir and on the other through the hook 85 to the outer part 86 of the weighted lever.

Finally I have shown in Figs. 3 and 8 a device for carrying the reservoir which reservoir is constituted on each side by a horizontal U-beam 87 connected with the longitudinal bearer 1 through vertical U irons 88 secured through suitable means 89 such as bolts, rivets or the like, the arrangement being reinforced if desired by means of the flat iron parts 90.

Obviously the device may be used in all cases where it is necessary to distribute under similar conditions, material other than iron.

The suction pipe described hereinabove may be replaced with advantage by a pipe comprising more than two elements whereby the same collapsed size being retained, a greater reach may be obtained. Moreover their extension and collapse may be obtained by means of a worm actuated device as shown by way of example, in Figs. 8 and 9. The tube itself instead of directly hanging from the plate 45 hangs therefrom through the agency of a beam 9' constituted by three telescoping elements each of which is connected through its lower end with the lower end of the corresponding element of the suction pipe. This beam comprises, as explained, three telescoping elements 92, 93, 94. The elementary beam 93 is provided therefor with lateral extensions held between the rollers 96 carried by the elementary beam 92. The beam 93 carries the rollers 97 and 98, the former rolling over the bottom of the beam 92 and the latter over the lateral projections 100 thereof. The beam 94 shows lateral projections 101 held between the rollers 102 carried by the beam 95. The beam 94 carries similarly the roller 103 resting on the bottom 104 of the beam 95 and rollers 105 bearing against the lateral projections 106 of the beam 93. The extension of the compound beam is controlled through the helical toothed wheel 107 meshing with the corresponding toothwork formed at 108 and 109 at the top of the beams 93 and 94. This wheel 107 is secured to the shaft 110 the pinion 111 keyed to which meshes with the pinion 112 controlled by the shaft 113 the other end of which is provided with a control wheel disposed near the operator.

A rotula 114 allows the desired inclination to be given to the compound beam. When the beam 94 has been extended outwards by a sufficient length through the rotation of the pinion 107, its projection 115 abuts against the stop 116 on the beam 93, whereby the toothwork 108 of the beam 93 is caused to mesh with the toothed wheel 107. The rotation of this wheel has therefore as a consequence a movement of the beam 93 outwards. This latter movement is limited by the stop 117 on the beam 93 and the stop 122 on the beam 92. It is apparent that a reversed rotation of the pinion 107 will make the beams 93 and 94 reenter in succession the beam 92.

In Figs. 11 and 12 which show respectively in side and plan view the suction nozzle, the latter 118 has the general shape of two frustocones connected through their smaller basis. A sheet iron hood 119 secured by a collar 120 is adapted to keep the entrance to the nozzle free and to allow air to pass along the path given out by the arrows $f-f$. To this end I provide in this hood an aperture 121 as shown in the plan view (Fig. 12). The nozzle is secured in any suitable manner to the last element of the suction pipe.

In the modified machine shown in Figs. 13 to 16 the frame is constituted by two longitudinal grinders 201 and 202 suitably interconnected in a manner not shown and carried through the agency of means not shown by the front steering wheels 203, 204 and by the rear driving wheels 205, 206. The frame carries a very low reservoir 207 connected with the fan 208. This reservoir is provided with a suction pipe 209 and a distributor 210.

A filter 211 disposed in the reservoir 207 between the suction pipe 209 and the fan 208 is adapted to stop the fine sand and dust particles which might be driven through said fan. This filter is constituted by a large number of vertical canvas sheets (Fig. 16). It is automatically shaken and cleaned by the trepidations during transportation.

The frame carries also a motor unit 212 adapted for controlling at will either the fan and nozzle or else the rear wheels and therethrough the distributor. The motor unit 212 comprises the motor 213 itself with its progressive clutching in and out device 214 controlled by the lever 214' and the change-speed gear 215. The transmission shaft 216, as it passes out of the change-speed gear controls through the pinion 217 and the chain 218 the pinion 219 keyed to the driving shaft 220. Between the clutch 214 and the change-speed gear there is arranged a bevel gear transmission connecting the main transmission line 216 with the shaft 221. The latter drives directly the fan through the agency of a toothed clutch 222. Between this clutch and the fan is disposed a second transmission line comprising the pinions 223, 224 and the chain 225. The pinion 224 controls through a progressive clutch 226 a shaft 227 serving in particular to give the suction nozzle a continuous rotary motion during the loading.

The fan sucks directly inside the reservoir 207 through the filter 211; the outlet of the fan is capped by a diffusing chimney 28.

The suction pipe 209 comprises a vertical or slightly sloping upwardly directed part, a bent part having a comparatively large radius and a downwardly directed nearly horizontal part adapted to enter the reservoir to a varying extent. This rigid arrangement is secured underneath a carriage 230 adapted to slide horizontally through the agency of the rollers 231 over a beam 232 adapted to pivot round the vertical shaft 233; to this end the beam 232 is integral with the shaft 33 which is guided and supported by the bearing 34 and the stop 35 fixedly secured to the frame over the reservoir by the uprights 236. Round the lower part of the pipe may rotate a special nozzle to be described hereinafter.

The nozzle may move vertically or rotate round the suction pipe. This rotation is controlled by the shaft 237 with which it is integral and which is adapted to move in the bearings 238 and 239 carried by the pipe 209 and the carriage 230. The arrangement comprising the nozzle and the shaft 237 hangs through a stop 240 from a screw 241 which may be moved vertically through a nut 242 carried by the carriage. The head of the screw is guided in a manner such that it cannot rotate, in a vertical slide 243. The nut 242 is controlled by hand through the handwheel 244 keyed to the shaft 245 which transmits its movement through the bevel pinions 246—247—248—249 to the corrugated shaft 250 carried by the beam. The intermediary pinions 247 and 248 are, to this end, lose on their spindle. The corrugated shaft 250 controls a screw 251 which meshes with the nut 242 and slides freely along the shaft 250 when the carriage moves along the beam.

The rotary motion of the beam round the shaft 233 is obtained through the handwheel 252, the screw 253 and the toothed sector 254 carried by the beam.

The rotation of the nozzle is controlled by the shaft 227 and the bevel pinions 255—256—257 of which the intermediary pinion 256 is freely mounted on the shaft 233. The pinion 257 carried by the beam engages the pinion 258 controlling the chain 259 meshing with the pinions 260, 261, 262 and 263 borne by the carriage and with the adjusting transmission pinion 64 at the end of the beam. The pinion 250 controls through the bevel pinions 265 and 266 the shaft 237. The latter is corrugated over a certain height so as to allow the pinion 266 to slide along it.

The movement of the carriage along the beam is obtained by the hand wheel 267 and the toothed sun wheel 269 loosely mounted on shaft 233. The sun wheel 269 meshes with the pinion 270 driving a chain 271 returned at the end of the beam by the pinion 272. One thrum of the chain is secured to the carriage at 273 and 274. The chain is carried near the pinions 270 and 272 by the rollers 275 and 276.

The connection between the suction channel and the reservoir is provided as follows. The beam 232 carries with it a cylindrical turret 280 carried by the shaft 233 and the side wall of which is provided with two apertures 281 and 282 for the passage of the suction pipe. The turret 80 passes through the reservoir and rotates with slight friction in same. The joints are closed by a yielding strip 283 of fatty leather or of aluminium secured to the reservoir and which the depression causes to bear against the turret.

The interval between the pipe and the turret is closed by yielding bellows 284 secured on one hand to the edge of the aperture 282 and on the other to a ring 285 adapted to slide with slight friction along the pipe or channel. The ring 285 may moreover move vertically along a slide 286 secured to the beam.

The rotary nozzle comprises chiefly two tubular elements 287 and 288 connected together and with the shaft 237 and carrying outwardly incurved blades. The tube 287 has a diameter slightly above that of the suction pipe; it carries at its upper end a tongued part 291 which prevents the reentrance of air; at its lower end, stays 289 shaped as screw elements connect it rigidly with the shaft 237. The direction of these screw elements is such that when the nozzle rotates, the material is urged upwards. The tube 288 surrounds the tube 287 but its lower end is slightly higher than that of the latter. The annular space between the two tubes affords means for the passage of air and is provided with partitions. The outline of a partition projected on the cylinder 287 developed on a plane is shown on Fig. 21. The tube 288 is provided outwardly with blades 292 horizontally incurved as shown in Fig. 19 so as to attract, when rotating, the material towards the center of the nozzle. These blades show moreover a gradually increasing slope from the outside to the inside so as to avoid any choking. They are secured to the tube 288 along helices whereby the material particles not carried along by the air rise along one blade before they are taken up by the next.

Underneath the rigid blades bounded by the plane of the lower end of the tube 287 are secured yielding blades 293 which may conform to the shape of the ground and act as brushes.

When the nozzle rotates in the direction of the arrow $a$ the blades bring near the aperture the material to be loaded which travels in the direction $b$; the air follows the path $c, c$ and carries the material along without any return backwards.

The double distributor 210 comprises paddle wheels 294 rotating at the lower end of the reservoir 295. A cylindrical gate 296 serves for adjusting the thickness of the sand layer admitted into the distributor. This sand moves over the sloping plane 297 and is driven regularly towards the outlet 298 through the blades of the wheel 294 rotating in the direction of the arrow $d$ at a small speed having a constant ratio with reference to that of the vehicle. To obtain this, I may for instance, dispose on the outside of the distributor inside a casing, a gearwork comprising the pinions 299, 300, 301, 302 and 303. The pinions 299, 302 and 303 are keyed to the shafts of the wheels 294. The intermediary pinions 300 and 301 mesh with the pinions 299 and 302. The pinion 303 is driven by the pinion 305 carried by the driving axle and the chain 306. The axis of the wheels 294 is tangent to the natural slope 307 of the sand when the gate is completely open. An interval of a few centimeters is provided between the blades and the distributor walls in order to prevent any wedging of the material. The sloping plane 297 passes upwards underneath the wheel in a manner such that the latter being stationary, the natural slope 308 of the sand tangent to the blades does not reach the lower end of the opening 298.

At each end of the wheels 94. the hopper passes round same as shown at 309 so as to prevent any material from falling between the blades and the side walls of the distributor and to prevent the axis of the wheel on which rotate the lower elements of the gate 296 from passing through the sand. The gate 296 may comprise a plurality of independent elements so as to allow the sand to be spread over varying widths. The blades of the wheel are interrupted so as to allow the passage of the lower ends of the gates. These points are protected like the ends of the wheels. The distributor closing means are shown in Figs. 23 and 24. The covers 304 having the shape shown are hinged at 309 on the distributor boxes; they carry at their periphery a rubber packing 310 which when the cover is closed is compressed between the cover and the flange 311 on the boxes. The covers 304 are controlled through the connecting rods 312 and the parallel motion pivotally secured to the horizontal axes 313, 314, 315 and 316 and adapted to be deformed in a vertical plane perpendicular to the covers. The axis 313 is carried by the distributor, the axis 315 is guided in a vertical plane and may be lifted or lowered through the lever 317 carrying at its end the slide 318 for said axis 315. The lever 317 is controlled by the horizontal shaft 325 and the control lever 326 (Fig. 16). The gates 296 are controlled simultaneously in a similar manner by the rods 319 pivotally secured to a deformable parallelogram the lower axis 320 of which is guided along a vertical axis by a slide 321. It may be lifted or lowered by the fork 322 actuated by the horizontal shaft 323 and the lever 324 (Fig. 16) on the outside of the distributor.

For sanding a coating, the working of the apparatus is as follows: the machine stopping in front of a sand or gravel heap on the side way, the driver disconnects the motor at 214, sets the lever of the change-speed box at its inoperative position, connects the clutch 222 and closes the distributor by acting on the lever 326 after which he reconnects the clutch 14 so as to start the fan and nozzle operating. The beam which was disposed alongside of the machine for operation is then returned by means of the handwheel 252 into a position such that the nozzle arrives in front of the foot of the sand heap, the blades being flush with the ground. If it is necessary to raise or to lower the nozzle, this is done through the handwheel 244 after the clutch 226 has been disconnected. It is then sufficient to act alternatively on the handwheels 252 and 267 so as to make the nozzle describe several arcs of circle having varying radii, whereby it may operate on the whole of the heap. When the loading is at an end, the clutches 14 and 22 are successively disconnected, the beam is brought alongside of the machine, the distributor is opened and the driving axle is reconnected. The adjustment of the amount of material distributed is provided if required during operation by acting on the gates through the lever 324. The useful volume of the reservoir is superior to the amount of sand to be distributed between two successive heaps whereby a certain unused provision of sand is still available when the machine arrives in front of the next heap to be loaded.

For recovering any surplus of gravel distributed on the road or formed on macadamized roads, I may use a rotary brush of any usual type not shown secured to the front of the machine or pushed by it and the axis of which is oblique with reference to the direction of movement so as to collect the material in a longitudinal string. The beam is directed towards the rear of the apparatus whereby the suction pipe may be disposed over said string. A non-rotary nozzle is used instead of the above-mentioned nozzle and comprises simply a large flat opening 327 connected with the tube 209 through a yielding duct 328 drawn along the ground next to the string of material through the rods 329 pivotally secured to the frame and to the shoes 330.

My improved machine is adapted for normally effecting the complete surface coating of roads including the sweeping, the spreading of the binding medium and the sanding in a single operation for each half width of the road without troubling to any extent the traffic. The sweeping and the sanding making use of the heaps on the sides of the road are provided as explained. The spreading of the binding medium such as tar, emulsified bitumen and the like, are provided for instance through atomizing under pressure by means of a trailer driven by the machine and carrying the reservoir for the binding medium, heat insulated if required. The atomizing means for the binding medium is disposed under the machine immediately behind the directing wheels and in front of the sand distributor, it is connected through a yielding duct with the trailer.

What I claim is:

1. A machine for distributing sand, gravel or the like material comprising a motor vehicle frame, a reservoir carried thereby adapted to receive and to contain the material between the front and rear axles of the vehicle frame, a pipe for loading the material, a rotatable turret forming with the reservoir an airtight receptacle provided with bellows into which the loading pipe opens, a horizontal beam pivotally secured to the frame, a carriage slidably carried by the said beam and carrying the free end of the pipe, a fan for creating a vacuum in the reservoir and means for distributing the material from the reservoir on to the road.

2. A machine for distributing sand, gravel or the like material comprising a motor vehicle frame, a reservoir carried thereby adapted to receive and to contain the material between the front and rear axles of the vehicle frame, a pipe for loading the material opening into the reservoir, a fan for creating a vacuum in the reservoir, a filter between the reservoir and the fan, rotary distributing means for the material and means for controlling same from the wheel controlling means of the machine.

3. A machine for distributing sand, gravel or the like material comprising a motor vehicle frame, a reservoir carried thereby adapted to receive and to contain the material between the front and rear axles of the vehicle frame, a pipe for loading the material, a rotatable turret forming with the reservoir an airtight receptacle provided with bellows into which the loading pipe opens, a horizontal beam pivotally secured to the frame, a carriage slidably carried by the said beam and carrying the free end of the pipe, a rotary nozzle at the free end of the loading pipe, a fan for creating a vacuum in the reservoir and means for distributing the material from the reservoir on to the road.

4. A machine for distributing sand, gravel or the like material comprising a motor vehicle frame, a reservoir carried thereby adapted to receive and to contain the material between the front and rear axles of the vehicle frame, a pipe for loading the material opening into the reservoir, a fan for creating a vacuum in the reservoir, a filter between the reservoir and the fan, a rotary blade arrangement adapted to move the material towards the free end of the loading pipe, double rotary distributing means controlled through the wheel controlling means and means for adjusting the flow of material between the reservoir and last mentioned means.

5. A machine for distributing sand, gravel or the like material comprising a motor vehicle frame, a reservoir carried thereby adapted to receive and to contain the material between the front and rear axles of the vehicle frame, a pipe for loading the material opening into the reservoir, a fan for creating a vacuum in the reservoir, a filter between the reservoir and the fan, a rotary blade arrangement adapted to move the material towards the free end of the loading pipe, double rotary distributing means controlled through the wheel controlling means and cylindrical gates for adjusting the flow of material between the reservoir and last mentioned means.

6. In a machine as claimed in claim 5 the provision of hingedly secured airtight packings for the distributor gates and a lever system controlling same.

In testimony whereof I have signed my name to this specification.

EUGÈNE JUSTIN NESTOR MILLET.